3,738,984
14,15-BETA-EPOXYCARDENOLIDES
Hans-Gunter Lehmann and Georg Zollner, Berlin, Germany, assignors to Schering Aktiengesellschaft, Berlin and Bergkamen, Germany
No Drawing. Continuation of abandoned application Ser. No. 873,086, Oct. 31, 1969. This application Nov. 26, 1971, Ser. No. 202,548
Claims priority, application Germany, Nov. 4, 1968, P 18 07 585.9
Int. Cl. C07c 173/02
U.S. Cl. 260—239.57     3 Claims

ABSTRACT OF THE DISCLOSURE 14,15β-epoxycardenolides of the formula

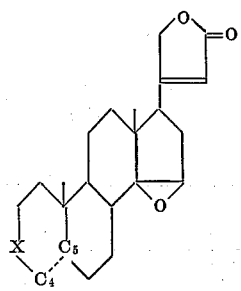

wherein $C_4 \ldots C_5$ is a saturated or unsaturated carbon-carbon bond or is

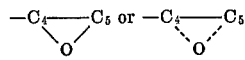

and wherein X is

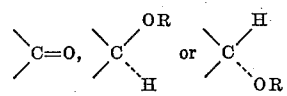

and wherein R is hydrogen, acyl, alkyl, a tetrahydropyranyl residue or a substituted tetrahydropyranyl residue.

The compounds are made from the corresponding steroids which, however, have an unsaturated carbon-carbon bond in the 14,15-position, which bond is subjected to epoxidation. If there is a carbon-carbon double bond also in the 4,5-position, this bond may be reduced or likewise epoxidized. A keto group present in the molecule may be reduced to hydroxyl or a free 3-hydroxyl group may be acylated or acetalized or esterified or oxidized to a keto group. If the 3-hydroxyl group is esterified, acetalized or etherified, it may be converted to a free hydroxyl group.

The drugs are useful as heart drugs of a high degree of activity with comparatively low toxicity and in particular a desirably broad span between effective dose and toxic dose.

BACKGROUND OF THE INVENTION

This is a continuation of Ser. No. 873,086 filed Oct. 31, 1969, now abandoned.

The invention relates to 14,15β-epoxycardenolides.

The use of the inotropically active natural cardenolides in medical practice is, even for the specialized physician, not without risk, particularly in case of higher dosage ranges. The usefulness of these drugs is therefore limited. The main drawback of the natural cardenolide is that, because of their well known high toxicity, their dosage must be kept at a comparatively low level. Severe heart afflictions which require treatment with high doses can therefore be treated only with difficulty, or not at all.

A problem closely connected with this drawback is the comparatively narrow therapeutic breadth resulting in a rapid transition into the toxic area in case of only small overdoses. It is therefore very difficult to control the dangerous side-effects which are caused by any type of overdose. The active range of the natural cardenolide is thus quite small, that is, the range of dosage from minimum inotropic action (+20% above the initial amount) up to maximum and still harmless effect is narrow.

From experiences with 14,15β-epoxy-bufadienolides such as the marinobufagin and resibufogenin, it has become known that the presence of a 14,15β-epoxy group results in a strong reduction and sometimes even complete loss of the heart-active effects. It was therefore highly unexpected and surprising that the 14,15β-epoxy-cardenolides of the invention, of which the composition will presently be formulated, not only avoid the described shortcomings of the natural cardenolides but have a higher inotropic action.

SUMMARY OF THE INVENTION

The present invention concerns 14,15β-epoxycardenolides of the formula

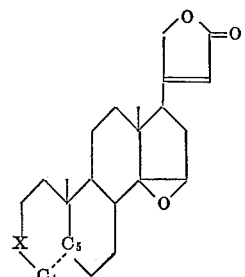

wherein $C_4 \ldots C_5$ is a saturated or unsaturated carbon-carbon bond or is

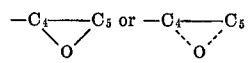

and wherein X is (a) >C=O in which case, if there is a hydrogen atom in the 5-position, it is α- or β-oriented, or is (b)

in which case, if there is a hydrogen atom in the 5-position, it is α-oriented, or is (c)

in which case, if there is a hydrogen atom in the 5-position, it is β-oriented, and wherein R is hydrogen, acyl, alkyl, tetrahydropyranyl or substituted tetrahydropyranyl.

The compounds of the invention are made by proceeding from cardenolides of the general formula

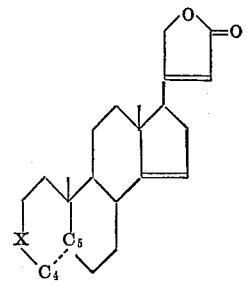

wherein $C_4 \ldots C_5$ and X have the same meaning as above and subjecting these compounds to an epoxidation.

If there is a 4,5 carbon-to-carbon double bond, this may be reduced or epoxidized subsequently.

The invention also embraces pharmaceutical compositions wherein the active ingredient is a compound as defined or if desired in form of its salt. It furthermore includes a method of treating heart conditions by application of the compounds defined above.

DESCRIPTION OF THE PREFERRED EMBODIMENT

If R is acyl in the above formula, it may be any acid residue of acids which are conventionally used for esterifying steroid alcohols. Preferred are acids of aliphatic carboxylic acids with 1–12 carbon atoms in the acid residue. Examples are, for instance, formic acid, acetic acid, propionic acid, enanthic acid, caproic acid, undecylic acid, etc. Of course, these acids can also be unsaturated, branched, poly-basic or can be substituted in conventional manner, particularly by hydrophilic groups. Examples are for instance trimethylacetic acid, t-butylacetic acid, phenylacetic acid, cyclopentylpropionic acid, halogenoacetic acid, oxypropionic acid, trihydroxy- and triacetoxypivalic acid, adamantane carboxylic acid, benzoic acid, succinic acid, adipic acid and, particularly if the compounds are used in water-soluble form, the residue R must contain a basic or acidic group. In the first case examples are for instance amino acetic acid, methyl-, ethyl-, dimethyl- or diethylamino acetic acid, etc., which if desired are reacted with the physiologically acceptable acids, such as hydrochloric, sulphuric and acetic acid. In the second case for instance polycarboxylic acids as mentioned above are suitable which if desired are reacted with physiologically acceptable inorganic or organic bases, such as sodium-, potassium-, ammonium- and substituted ammonium hydroxides.

If a hydroxyl group in the 3-position is etherified, the preferred alkyl residue in that case would be methyl or ethyl.

If R is an acetal residue, a preferred group would be the tetrahydropyranyl residue. For the purposes of the present specification and claims, the term "tetrahydropyranyl group or residue" should include groups derived from tetrahydropyran, of which examples are particularly the glycoside residues of the D and L series.

Hydroxyl groups present in the radical R can also be present in acylated form.

As has been pointed out in the Summary of the Invention, if the $C_4 \ldots C_5$ groups is saturated, the hydrogen atom in the 5-position may be either α-oriented or β-oriented depending on the type of group which is represented by X.

Utility

The compounds of the invention are distinguished by their cardiac action. In particular, they have high therapeutic breadth and, at the same time, a desirably high inotropic action.

As the following Table 1 shows, the compounds of the invention have a far better therapeutical breadth than the natural cardenolides. This is shown in the table by comparing two compounds of the invention, to wit, 3β-methoxy-14,15β-epoxy-4,20(22)-cardadienolide (II) and 3β - formyloxy - 14,15β - epoxy-4,20(22)-cardadienolide (III) with the well known g-strophanthin.

The inotropic action was determined by well established procedures by isolated atria from the hearts of cats and testing the still spontaneously beating atria. The increase in positive inotropic action was related to an initial value equal to 100. As the terminal product of the test series, the dose was determined at which all cat atria of a group were dead 5 minutes after application.

TABLE 1

| Dose in γ/ml. of volume of bath | I | II | III |
|---|---|---|---|
| 0.01 | 104 | 103 | 104 |
| 0.03 | 109 | 108 | 110 |
| 0.05 | 114 | 112 | 113 |
| 0.1 | 124 | 116 | 132 |
| 0.2 | 138 | 122 | 145 |
| 0.3 | 145 | 128 | 148 |
| 0.4 | 124 | 132 | 152 |
| 0.5 | | 134 | 155 |
| 1.0 | | 138 | 166 |
| 2.0 | | 141 | 177 |
| 3.0 | | 149 | 158 |
| 5.0 | | 163 | 149 |
| 7.0 | | 165 | 121 |
| 10.0 | | 167 | 107 |
| 20.0 | | 175 | 74 |
| 50.0 | | 142 | 3 |
| 100.0 | | 37 | |

The 14,15β-epoxycardenolides of the invention also have the advantage that they can be administered at a higher dosage, as distinguished from the natural cardenolides. This is frequently desirable or even necessary in practical usage if it can be done without reaching the limit dose where the transition to the toxic dose takes place. This is illustrated in the following Table II by comparing the compounds II to VII (invention) with g-strophanthin (I).

TABLE 2

| Test No. | Compound | Limit dose in γ/ml. of volume of bath |
|---|---|---|
| I | G-strophanthin | 0.3 |
| II | 3β-methoxy-14,15β-epoxy-4,20(22)-cardadienolide. | 20 |
| III | 3β-formyloxy-14,15β-epoxy-4,20(22)-cardadienolide. | >2 |
| IV | 3β-hydroxy-14,15β-epoxy-4,20(22)-cardadienolide. | 2 |
| V | 3β-acetoxy-14,15β-epxoy-4,20(22)-cardadienolide. | >2 |
| VI | 3β-diethylaminoacetoxy-14,15β-epoxy-4,20(22)-cardadienolide hydrochloride. | >2 |
| VII | 3α-hydroxy-14,15β-epoxy-5β-card-20(22)-enolide. | >2 |

The 14,15β-epoxycardenolides of the invention are less toxic, have a higher intropic action and a desirable therapeutic breadth, and therefore are without comparable risk for medical use as distinguished from the natural cardenolides.

In medical practice the compounds of the invention can be used for treatment of cardiac diseases, particularly for heart insufficiencies.

PROCESS OF MAKING THE COMPOUNDS

The compounds of the invention can be made by epoxidizing the corresponding 14,20(22)-cardadienolides in the 14,15-position double bond.

The starting compounds of the invention accordingly may have the following formula:

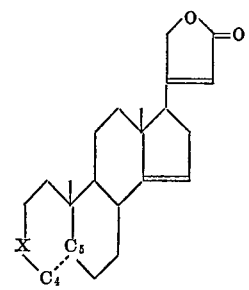

wherein $C_4 \ldots C_5$ and X have the meaning as given above. According to the invention, the $\Delta^{14(15)}$-double bond of these starting compounds is subjected to an epoxidation. Depending on the desired group which is wanted for X and $C_4 \ldots C_5$, this step will then be followed by one or the other of the following steps:

A keto group which is present in the starting compound may be reduced to a hydroxyl group or a free 3-hydroxyl group may be subjected to acylation, acetalization, etherification or oxidation to a keto group. If there is present an esterified, acetalized, or etherified hydroxyl group, it may be converted to the free hydroxyl group. If the starting compound includes a 4,5-carbon-carbon double bond, this bond may be reduced or epoxidized.

The epoxidizing is preferably carried out by forming an addition reaction at the 14,15 double bond of the starting product with hypohalogenous, acid, e.g. HOBr, and then splitting off from the first-obtained halogenohydrin hydrogen halide, for instance hydrogen bromide by means of basic reagents.

The addition reaction with hypohalogenous acid is preferably effected by reacting the 14,15 double bond with agents adapted to liberate hypohalogenous acid, for instance hypobromic acid, in the course of the reaction. Presferred reagents are the N-halogeno acylamides, for instance N-bromoacetamide or N-halogeno-acylimide, for example N-bromosuccinimide.

The closure of the epoxy ring in the 14,15 position of the first-obtained halogeno hydrin is preferably effected with basic reagents such as potassium acetate. A preferred embodiment is a chromatographic process to which the halogenohydrin is subjected on aluminum oxide, preferably basic aluminum oxide.

This reaction then is followed by various alternative or optional steps such as the reduction of a 3-keto group or the oxidation, esterifiction, etherification or acetalization of a 3-hydroxyl group, the saponification or ether elimination of a 3-acyloxy or 3-alkoxy group or the reduction of a 4,5- carbon-to-carbon double bond, or the epoxidation of the latter bond.

For the purpose of the invention the term "acetalizing etc." shall include the introduction of a tetrahydropyranyl residue and also the introduction of a glycoside residue.

If the finally desired product includes a 4,5-epoxy group in addition to the 14,15$\beta$-epoxy group, the 4,5-group can either be introduced simultaneously with or subsequently to introduction of the 14,15-epoxy group. However, it is to be noted that a partial epoxidation in the 14,15-position will depend on the type of substituent in the 3-position of the starting product. For instance, if X in the starting product is a free or functionally modified hydroxyl group, the reaction carried out in accordance with the invention will result in a simultaneous epoxidation of a 4,5 double bond, together with the 14,15 double bond. By oxidation of the 3-hydroxyl group it is then possible to obtain the corresponding 3-keto-4,5;14,15-diepoxy compounds.

If it is desired to obtain products in which X is a free or functionally modified hydroxyl group and $C_4 \ldots C_5$ is a carbon-to-carbon double bond, the starting product will be chosen to obtain the 3-keto-$\Delta^4$ grouping. After epoxidizing the 14,15-position, this is then followed by reduction of the 3-keto group to the hydroxyl group. However, it will be understood that in order to make the 3-keto bisepoxy-cardenolides, it is possible also to start from 3-keto-$\Delta^4$-steroids and first to carry out the 14,15$\beta$-epoxidation as the initial step.

The follownig examples will further illustrate the invention.

EXAMPLE 1

350 mg. of 3-oxo-4,14,20(22)-cardatrienolide was dissolved in 120 ml. of peroxide-free dioxane. The solution was reacted with 300 mg. of N-bromoacetamide and a solution of 0.06 ml. 70%-perchloric acid in 12 ml. water was then added dropwise within a period of 20 minutes. The mixture was stirred for 3 hours in the dark, diluted with acetic acid ester, washed with a bisulfite soluton, with a bicarbonate solution and with water. The organic phase was then dried with sodium sulfate and concentrated to dryness in a vacuum. The residue was subjected to chromatography in chloroform on basic aluminum oxide. After recrystallization from acetic acid ester, 162 mg. of 14,15$\beta$-epoxy-3-oxo-4,20(22)-caradienolide was obtained with a melting point of 248–250° C.

EXAMPLE 2

1.5 g. of 14,15$\beta$-epoxy-3-oxo-4,20(22)-cardadienolide was dissolved in 140 ml. abs. tetrahydrofuran. 2 g. of lithium-aluminum tri-tert.-butoxyhydride was added while stirring, and the mixture was permitted to stand for 20 hours at room temperature. Thereupon, the mixture was stirred into acetic acid ice water and extracted with methylene chloride. The dried methylene chloride phase was concentrated in vacuum to dryness and the residue was recrystallized from acetic acid ester. There were obtained 1.04 g. of 3$\beta$-hydroxy-14,15$\beta$-epoxy-4,20(22)-cardadienolide of a melting point of 198–201° C.

EXAMPLE 3

368 mg. of 14,15$\beta$-epoxy-3-oxo-4,20(22)-cardaienolide was dissolved in 10 ml. of dimethylformamide, 1 ml. triethylamine and 200 mg. of 10% palladium-carbon were then added, and the mixture was then hydrogenated until it absorbed 1 mmol of hydrogen. It was then removed by filtration from the catalyst, concentrated in a vacuum and the residue was taken up in carbon tetrachloride and subjected to chromatography on silica gel with increasing acetic acid ester gradients in carbon tetrachloride. From the first fraction there was separated 14,15$\beta$-epoxy-3-oxo-5$\alpha$-card-20(22) enolide which, after recrystallization from acetic acid ester, had a melting point of 281–282° C. The yield was 100 mg. The later fractions contained 14,15$\beta$-epoxy-3-oxo-5$\beta$-card-20(22)-enolide which, after recrystallization from acetic acid ester, had a melting point of 204.5–206° C. The yield was 205 mg.

EXAMPLE 4

80 mg. of 14,15$\beta$-epoxy-3-oxo-5$\beta$-card-20(22)-enolide was dissolved in 5 ml. of abs. tetrahydrofuran and reacted with 100 mg. of lithium-aluminum - tri - tert.-butoxyhydride. After standing for 48 hours at room temperature, the mixture was reacted with a small amount of acetic acid ice water and subjected to exhaustive extraction with methylene chloride. The organic phase was then concentrated to dryness and the residue was subjected to chromatography on silica gel. The crude yield was 66 mg. of 3$\alpha$ - hydroxy-14,15$\beta$-epoxy-5$\beta$-card-20(22)-enolide. After recrystallization from acetic acid ester, the compound had a melting point of 228.5–230.5° C.

EXAMPLE 5

100 mg. of 14,15$\beta$-epoxy-3-oxo-5$\alpha$-card-20(22)-enolide was dissolved in 40 ml. of abs. tetrahydrofuran and reacted with 150 mg. of lithium-aluminum-tri-tert.-butoxy hydride. The mixture was then permitted to stand at room temperature for 30 hours and reacted with acetic acid ice water and extracted with methylene chloride. The separated organic phase was concentrated to dryness. After recrystallization from acetic acid ester, there was obtained 64 mg. of 3$\beta$-hydroxy-14,15$\beta$-epoxy-5$\alpha$-card-20(22)-enolide having a melting point of 232.5–234.5° C.

EXAMPLE 6

5.2 ml. of abs. pyridine was reacted with 1.73 ml. of a 100%-concentration formic acid and 0.69 ml. acetic acid anhydride. The mixture was stirred at room temperature and 250 mg. of 3$\beta$-hydroxy-14,15$\beta$-epoxy-4,20(22)-cardadienolide was then added and the mass was permitted to stand for 15 hours at room temperature. Thereafter, another amount of 0.69 ml. acetic acid anhydride was added and the mixture was poured into ice water after 6 hours. It was then subjected to extraction with ether, washing with water and drying over sodium sulfate. The separated organic phase was concentrated to dryness. After recrystallization of the residue from diisopropylether there were obtained 210 mg. of 3$\beta$-formyloxy-14,15$\beta$-epoxy- 4,20(22)-cardadienolide having a melting point of 197.5–198° C.

EXAMPLE 7

A mixture of 200 mg. of 3β-hydroxy-14,15β-epoxy-4,20(22)-cardadienolide and 2 ml. of abs. pyridine and 1 ml. of acetic acid anhydride were permitted to stand for 15 hours at room temperature. The mixture was then poured into ice water, extracted with ether and the organic phase was washed with an NaCl solution. The organic phase was then dried and the ether separated by drying in a vacuum. After recrystallization from diisopropyl ether there was obtained 125 mg. of 3β-acetoxy-14,15β-epoxy-4,20(22)-cardadienolide having a melting point of 163–164° C.

EXAMPLE 8

1 g. of 3β - hydroxy-14,15β-epoxy-4,20(22)-cardadienolide was dissolved in 5 ml. of abs. pyridine. A solution of 530 mg. of chloroacetic acid anhydride in 5.5 ml. abs. ether was then added dropwise at 0° C. and permitted to stand for 15 hours at room temperature. 100 ml. water was then slowly added dropwise. The precipitate which formed was removed by suction and washed with water, 1% hydrochloric acid, sodium bicarbonate solution and water. After drying there was obtained 1.05 g. of 3β-(chloroacetoxy)14,15β-epoxy - 4,20(22) - cardadienolide. The crude compound had a melting point of 119° C. (decomposition).

EXAMPLE 9

1 g. of 3β-chloroacetoxy-14,15β-epoxy-4,20(22)-cardadienolide was dissolved in 30 ml. abs. tetrahydrofuran and reacted with 0.7 ml. of diethylamine. After 10 days, the diethylammonium chloride that crystallized out was removed by filtration and the filtrate was concentrated in vacuum up to dryness. After recrystallization from ethanol, the 3β-diethylaminoacetoxy-14,15β-epoxy-4,20(22)-cardadienoiled had a melting point of 152–154° C.; yield 640 mg.

The diethylaminoacetate was taken up in tetrahydrofuran, the solution reacted with an ether solution of hydrochloric acid and immediately precipitated with abs. ether. After filtration and drying there were obtained 640 mg. of 3β-(diethylammonoacetoxy) - 14,15β - epoxy-4,20(22)-cardadienolide-chloride, having a melting point of 128–130.5° C.

EXAMPLE 10

A mixture of 10 ml. abs. tetrahydrofuran, 200 mg. of 3β-hydroxy-14,15β-epoxy - 4,20(22) - cardadienolide and 0.5 ml. of dihydropyran was reacted with 1 drop of phosphorus oxychloride. After standing for 90 minutes at room temperature, 2 drops of abs. pyridine were added. The mixture was stirred into ice water containing sodium bicarbonate. The precipitate was then removed by filtration, washed with water, dried and recrystallized from diisopropylether. There were obtained 140 mg. of 3β-tetrahydropyranyloxy - 14β,15β - epoxy-4,20(22)-cardadienolide having a melting point of 138–148° C.

EXAMPLE 11

A mixture of 3β-hydroxy-14,15β-epoxy-4,20(22)-cardadienolide, 0.4 g. of silver carbonate and 4 ml. abs. benzene was heated to boiling. After removal of traces of water by means of azeotropic distillation, and replenishing the abs. benzene, 2 ml. of methyl iodide were added and heated under reflux for 15 hours while excluding all humidity. The silver salts were then removed by suction and the mass washed with benzene. The filtrate was concentrated to dryness. The residue was subjected to chromatography on silica gel and the thus-obtained crude product was recrystallized from diisopropylether/pentane. There was obtained 125 mg. of 3β-methoxy-14,15β-epoxy-4,20(22)-cardadienolide, melting point 174–176° C.

EXAMPLE 12

A mixture of 200 mg. of 3β-hydroxy-14,15β-epoxy-4,20(22)-cardadienolide, 2 ml. abs. pyridine and 1 ml. propionic acid anhydride was permitted to stand at room temperature for 15 hours. The mixture was then poured into ice water and the precipitated mass was stirred for 90 minutes. The precipitate was then removed by filtration, washed with water and dried. After recrystllization from diisopropylether, there was obtained 140 mg. of 3β-propionyloxy - 14,15β - epoxy - 4,20(22)-cardadienolide, having a melting point of 180–181.5° C.

EXAMPLE 13

1.28 g. of m-chloroperbenzoic acid dissolved in 12 ml. ether was added at 0° C. to a solution of 200 mg. of 3β-hydroxy-14,15-epoxy-4,20(22) - cardadienolide was dissolved in 25 ml. chloroform. After standing for 2 hours at 0° C., the solution was washed with water, iron-II-sulfate solution, again with water, with a 5% sodium carbonate solution and again with water. The dried solution was concentrated to dryness and the residue subjected to chromatography on silica gel. With the first eluates there was obtained 20 mg. of 3β-hydroxy-4,5α;14,15β-bisepoxy-20(22)-cardenolide which, after recrystallization from acetic acid ester had a melting point of 237–239° C. Yield: 10 mg.

The latter fractions contained 110 mg. of crude 3β-hydroxy-4,5β;14,15β-bisepoxy - 20(22) - cardenolide which, after recrystallization from acetic acid ester, had a melting point of 202.5–204° C. Yield: 80 mg. The intermediate fraction contained a mixture of both epoxides.

EXAMPLE 14

397 mg. of 3β-acetoxy-4,14,20(22)-cardatrienolide was dissolved in 25 ml. dioxane. 740 mg. of N-bromoacetic acid amide and then 0.12 ml. 70% perchloric acid in 2.5 ml. water were then added to the solution and subjected to stirring for 3 hours at room temperature in the dark. 80 ml. of actic acid ester were then added and the mass was washed with water, sodium bicarbonate solution and again with water. After drying, the solution was concentrated to dryness and the residue was taken up in chloroform. The solution was then passed through a column of basic aluminum oxide. After 15 hours elution was effected with chloroform and the combined evaporation residues were subjected to chromatography on silica gel. There was obtained 310 mg. of crude product. After recrystallization from acetic acid ester/diisopropyl ether, there was obtained 90 mg. of 3β-acetoxy-4,5β;14,15β-bisepoxy-20(22)-cardenolide; melting point 158–160° C.

EXAMPLE 15

A mixture was prepared of 3 g. of 3β-hydroxy-14,15β-epoxy-4,20(22)-cardadienolide, 150 ml. ethylene chloride and 4.55 g. of freshly prepared silver carbonate. One half of the solvent was then distilled off from the mixture. While continuing the distillation in order to maintain the same reaction volume, a solution of 5.5 g. of acetobromoglucose in 650 ml. ethylene chloride was then added to the solution within a period of 5 hours. Thereafter, another 50 ml. of ethylene chloride was added dropwise while continuing the distillation. The silver salts were then removed by suction and the filtrate was concentrated to dryness. There remained 8.5 g. of crude mixture. By chromatographic purification of 1 g. of the crude mixture on silica gel, there was obtained 70 mg. of 3β-(tetra-O-acetyl - D - glucopyranos-1'β-yloxy)-14,15β-epoxy-4,20-(22)-cardadienolide in the form of an oily product.

7.5 g. of the thus-obtained crude mixture were mixed upon stirring with 1 liter of methanol, 320 ml. of water and 7 g. of potassium bicarbonate during a period of 10 days at 15° C. The methanol was then removed in a vacuum at room temperature. The aqueous phase was completely extracted with ether—5 times with 300 ml. of a chloroform/ethanol mixture (9:1) in each instance, and 5 times with 300 ml. of a chloroform/ethanol mixture (9:2) in each instance. The 9:1 extracts were then removed in vacuum at 30° C. and there was thus obtained 460 mg. of 3β(D-glucopyranos-1'β-yloxy)-14,15β-epoxy-4,20(22)-cardadienolide.

EXAMPLE 16

250 mg. of 3β-hydroxy-14,15β-epoxy-4,20(22)-cardadienolide and 700 mg. of tri-(acetoxymethyl)-acetylchloride were mixed with 5 ml. abs. pyridine while at first stirring and were then permitted to stand for 120 hours at room temperature. The mass was then poured into ice water, extracted with ether. The extract was washed with water, diluted hydrochloric acid and again with water, and then it was subjected to drying. After concentration of the organic phase to dryness and chromatographic purification of the isoltaed crude product, there was obtained 3β-((triacetoxymethyl) - acetoxy)-14,15β-epoxy-4,20(22)-cardadienolide in form of an oily product.

180 mg. of 3β-((triacetoxymethyl)-acetoxy)-14,15β-epoxy-4,20(22)-cardadienolide, 16 ml. methanol, 180 mg. of sodium bicarbonate and 4 ml. of water were stirred for 25 hours at room temperature. The mixture was stirred into an ice-NaCl mixture and extracted with ethanol-containing chloroform. The extract was concentrated in vacuum to dryness and subjected to purification by chromatography on silica gel. There was obtained 3β-((trihydroxymethyl) - acetoxy)-14,15β-epoxy-4,20(22)cardadienolide; melting point 184.5–185° C.

EXAMPLE 17

A mixture of 200 mg. of 3-oxo-4,14,20(22)-cardatrienolide and 70 ml. acetone was subjected to stirring. 200 mg. of N-bromoacetamide dissolved in 2 ml. water was then reacted with the mixture and the mass was stirred for 24 hours at room temperature in the dark. The acetone was removed in a vacuum and the residue reacted with water and extracted with chloroform. The organic phase was subsequently washed with dilute sodium carbonate solution and water. After concentration it was then passed into a column with basic aluminum oxide. After 15 hours it was eluted with chloroform and after concentration there were obtained 170 mg. of crude 14,15β-epoxy-3-oxo-4,20(22)-cardadienolide which, after recrystallization from acetic acid ester melted at 247–249° C. The product was identical with that obtained according to the process of Example 1.

EXAMPLE 18

A mixture of 0.3 g. of 3β-hydroxy-14,15β-epoxy-4,20-(22)-cardadienolide, 3 ml. ethyliodide and 0.6 g. silver oxide in 6 ml. abs. benzene was heated for 17 hours under reflux. The silver salts were removed by filtration. The mass was washed then with benzene and the filtrate was concentrated to dryness in a vacuum. The residue was subjected to chromatography on silica gel. After recrystallization from diisopropylether and acetic acid ester, there were obtained 120 mg. of 3β-ethoxy-14,15β-epoxy-4,20-(22)-cardadienolide, melting point 186° C.

EXAMPLE 19

The same process was carried out as in Example 18 but using 3 ml. n-propyl iodide instead of the ethyl iodide. After recrystallization from ether/hexane there was obtained 65 mg. of 3β-n-propyloxy-14,15β-epoxy-4-20(22)-cardadienolide; melting point 156–158° C.

EXAMPLE 20

250 mg. of 3β-hydroxy-14,15β-epoxy-4,20(22)-cardadienolide were reacted with 3 ml. pyridine and 0.3 ml. chloroformic acid methylester. The solution was permitted to stand for 15 hours at room temperature. It was then stirred into ice water and the precipitate was removed by filtration, washed with water. The residue was recrystallized after drying from methylene chloride/diisopropylether. There was obtained 160 mg. 3β-methoxycarbonyloxy-14,15β-epoxy-4,20(22)-cardadienolide; melting point 201–202° C.

EXAMPLE 21

The same method was used as in Example 20, but instead of the chloroformic acid methylester there was used 0.3 ml. of chloroformic acid ethylester. After recrystallization from methylene chloride/diisopropylether there were obtained 220 mg. of 3β-ethoxycarbonyloxy-14,15β-epoxy - 4,20(22) - cardadienolide; melting point 181–182° C.

EXAMPLE 22

A mixture of 200 mg. 3β-hydroxy-14,15β-epoxy-4,20 (22)-cardadienolide, 3 ml. pyridine and 300 mg. methoxalic acid anhydride is permitted to stand for 15 hours at room temperature, then subjected to precipitation with water and recrystallized from methylene-chloride/diisopropylether. There was obtained 205 mg. of 3β-methoxalyloxy-14,15β-epoxy-4,20(22)-cardadienolide; M.P. 116 to 117° C.

We claim:
1. The compound which is 3β-hydroxy-4,5α;14,15β-bis-epoxy-20(22)-cardenolide.
2. The compound which is 3β-hydroxy-4,5β;14,15β-bis-epoxy-20(22)-cardenolide.
3. The compound which is 3β-acetoxy-4,5β;14,15β-bis-epoxy-20(22)-cardenolide.

References Cited

UNITED STATES PATENTS

| | | | |
|---|---|---|---|
| 2,656,349 | 10/1953 | Ruzicka et al. | 260—239.55 |
| 2,930,791 | 3/1960 | Meister et al. | 260—239.57 |
| 2,968,596 | 1/1961 | Meister et al. | 195—51 |
| 3,068,229 | 12/1962 | Camerino et al. | 260—239.57 |
| 3,177,200 | 4/1965 | Meyer | 260—210.5 |
| 3,280,115 | 10/1966 | Bertin et al. | 260—239.55 |
| 3,325,484 | 6/1967 | Deghenghi | 260—239.55 |

HENRY A. FRENCH, Primary Examiner

U.S. Cl. X.R.

424—241